US009235556B2

(12) United States Patent
Yaakov et al.

(10) Patent No.: US 9,235,556 B2
(45) Date of Patent: Jan. 12, 2016

(54) ADAPTIVE BASELINE BASED ON METRIC VALUES

(71) Applicant: HEWLETT-PACKARD DEVELOPMENT COMPANY, L.P., Houston, TX (US)

(72) Inventors: Erez Yaakov, Herzelia (IL); Marina Lyan, Modiin (IL); Ira Cohen, Modiin (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 523 days.

(21) Appl. No.: 13/726,690

(22) Filed: Dec. 26, 2012

(65) Prior Publication Data

US 2014/0180635 A1 Jun. 26, 2014

(51) Int. Cl.
 G06F 17/18 (2006.01)
 G06Q 10/06 (2012.01)

(52) U.S. Cl.
 CPC .............. *G06F 17/18* (2013.01); *G06Q 10/063* (2013.01)

(58) Field of Classification Search
 CPC ...... G06Q 10/063; G06F 17/18; H04L 43/16; H04L 41/5006
 USPC ........... 702/79, 179, 185; 455/67.13; 709/224
 See application file for complete search history.

(56) References Cited

U.S. PATENT DOCUMENTS

| 8,112,042 | B2 | 2/2012 | Ikeda |
| 2006/0155738 | A1 | 7/2006 | Baldwin |
| 2011/0301491 | A1 | 12/2011 | Stadler |
| 2013/0282331 | A1* | 10/2013 | Cohen et al. .................. 702/179 |

OTHER PUBLICATIONS

Ira Cohen et al., U.S. Appl. No. 13/454,572 entitled Detecting Abnormal Behavior filed Apr. 24, 2012 (29 pages).
Christoph Reller et al., A Model for Quasi-Periodic Signals With Application to Rain Estimation From Microwave Link Gain, Jan. 2012 (5 pages).
Antal Soos, Thesis—The University of Calgary, An Optimal Adaptive Power System Stabilizer, Oct. 1997 (168 pages).
Jake D. Brutlag—WebTV, Aberrant Behavior Detection in Time Series for Network Monitoring, pp. 139-146 of The Proceedings dated on or before Oct. 17, 2012 (11 pages).
Weihua Zhuang, RLS Algorithm with Variable Forgetting Factor for Decision Feedback Equalizer over Time-Variant Fading Channels, 1998 (15 pages).

* cited by examiner

*Primary Examiner* — John H Le
(74) *Attorney, Agent, or Firm* — Trop, Pruner & Hu, P.C.

(57) ABSTRACT

Values of a metric are provided at irregular intervals. A forgetting factor is calculated based on a difference between the intervals, and a statistical parameter is computed using the forgetting factor that causes different weights to be placed on the corresponding values of the metric, where the statistical parameter is part of an adaptive baseline.

16 Claims, 4 Drawing Sheets

ADAPTIVE BASELINE BASED ON METRIC VALUES

BACKGROUND

A metric can be monitored for determining whether an environment is performing normally. An environment in which the metric is monitored can include a system, such as a processing system, cloud system, storage system, and so forth. Alternatively, a monitored environment can include an enterprise such as a business concern, an educational organization, government agency, and so forth. The metric can be monitored over time, and in response to detecting values of the metric deviating from an expected value, abnormal behavior can be indicated.

BRIEF DESCRIPTION OF THE DRAWINGS

Some embodiments are described with respect to the following figures.

DETAILED DESCRIPTION

Figure 1:
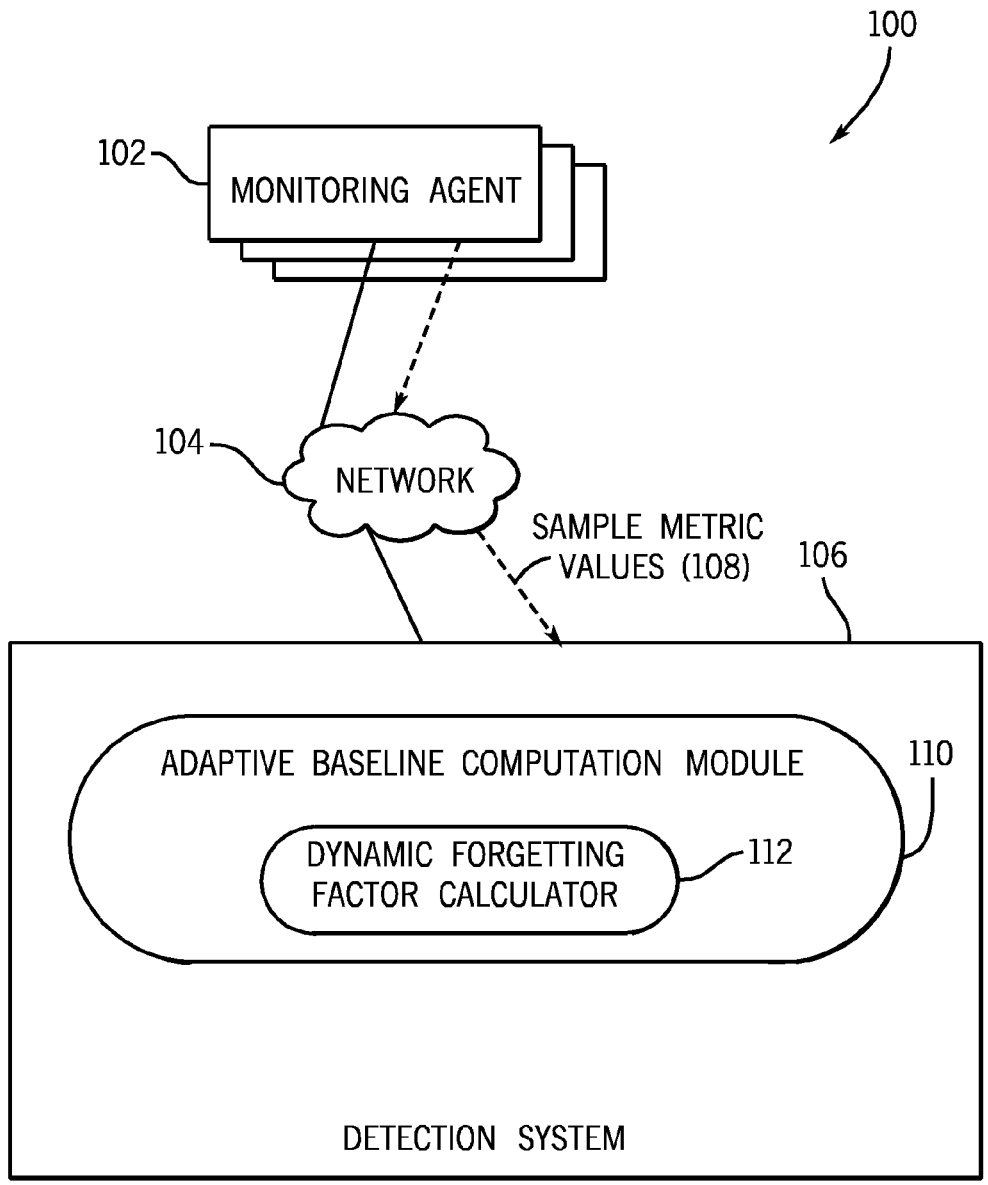
FIG. 1 is a block diagram of an example system that incorporates some implementations.

To determine whether values of a monitored metric are deviating or have deviated from an expected behavior, a baseline can be determined. A baseline can include at least one statistical parameter that is derived based on past observed values (also referred to as "historical values") of the metric. For example, the at least one statistical parameter can include a mean of the metric values, a standard deviation of the metric values, and so forth.

A metric that can be monitored can include any metric regarding operation of a system. For example, a metric can include processor usage or memory usage in a system (e.g. processing system, cloud system, storage system, etc.). Alternatively, a metric can include communication throughput in a network. As yet another example, a metric can include a performance metric relating to execution of an application in a system.

In other examples, a monitored metric can include a metric relating to performance of an enterprise such as a business concern, an educational organization, a government agency, and so forth. For example, the monitored metric can be a financial metric such as profit, cost, revenue, and so forth. As another example, a metric of an enterprise can include a metric relating to on-time delivery of offerings (e.g. products or services) of an enterprise.

Values of a metric can be sampled using any of various data sampling mechanisms. For example, sensors can be used to measure metric values. Alternatively, data collectors can be used to collect sample values of other types of metrics.

A baseline that is computed based on historical values of a metric can be an adaptive baseline, which can vary as additional sample values of the metric are received over time. In some cases, computation of an adaptive baseline can be based on an assumption of fixed intervals in the receipt of successive sample values of the metric. The fixed intervals can include fixed time intervals, where the sample values are received periodically. For example, a first metric sample value can be received in a first time interval, a second metric sample value can be received in a second time interval, and so forth. When the time intervals in which corresponding metric sample values are received are fixed time intervals, then the time gaps between successive pairs of time intervals (or successive pairs of metric sample values) are uniform.

However, in other cases, the time intervals associated with receipt of successive metric sample values can be irregular, which results in different time gaps between successive metric sample values. For example, irregular time intervals can be caused by a burst of metric sample values received within a first relatively short time period, followed by a second time period in which a smaller number of metric sample values or no metric sample values are received. Alternatively, time gaps in metric sample values can be caused by a planned or unplanned downtime of a data collection mechanism, for example.

Using an adaptive baseline computation technique that assumes fixed intervals in receipt of metric sample values can result in computation of an inaccurate baseline when the time intervals of the metric sample values are irregular.

Although reference is made in the present discussion to time intervals associated with receipt of sample values of a metric, it is noted that in other implementations, the intervals of metric sample values can be other types of intervals, such as spatial intervals, and so forth. More generally, sample values of a metric from which an adaptive baseline is computed can be associated with irregular intervals.

In accordance with some implementations, the computation of an adaptive baseline can be based on use of a dynamic forgetting factor that varies based on the time gap (or time difference) between successive pairs of metric sample values. The adaptive baseline of a metric can be used for determining whether a given collection of metric values is indicative of an abnormal behavior in a monitored environment. An abnormal behavior refers to a condition of the monitored environment in which the monitored environment has an operating characteristic that deviates from an expected condition.

A forgetting factor places greater weight on more recent metric sample values as compared to earlier metric sample values. More specifically, for metric sample values received at irregular time intervals, the forgetting factor can determine the rate at which past sample values of a metric are forgotten. A forgetting factor can also be applied in the context of non-temporal intervals between metric sample values.

More generally, a forgetting factor is a factor that allows for different weights to be placed on corresponding sample values of a metric. For example, the forgetting factor can cause a first weight to be applied on a metric sample value in a first interval to be different from the weight applied on another metric sample value in a second interval.

The forgetting factor is dynamically calculated based on a difference (e.g. time difference, spatial difference, etc.) between successive intervals of metric sample values. By using the dynamic forgetting factor according to some implementations, a more accurate computation of an adaptive baseline based on metric sample values that are received in irregular intervals can be performed.

In the present discussion, although reference is made to computing an adaptive baseline based on sample values of a metric, it is noted that techniques or mechanisms according to some implementations can also be applied for computing adaptive baselines based on sample values of multiple metrics.

FIG. 1 is a block diagram of an example arrangement 100 that includes monitoring agents 102 for sampling values of a metric in a monitored environment. The monitored environment can be a system, such as a processing system, storage system, cloud system, and so forth. Alternatively, the monitored environment can be an enterprise.

The monitoring agents 102 can be sensors or other types of data collection mechanisms. The monitoring agents 102 can be implemented as hardware devices, or as machine-readable instructions executable on processors.

The monitoring agents 102 are coupled to a network 104. In addition, a detection system 106 according to some implementations is connected to the network 104. The network 104 can include a private network (e.g. local area network or LAN) or a public network (e.g. Internet), or some combination of the foregoing. Sample metric values 108 collected by the monitoring agents 102 are transmitted by the monitoring agents 102 to the detection system 106 over the network 104. The sample metric values 108 can be collected at irregular time intervals.

The detection system 106 includes an adaptive baseline computation module 110 for computing an adaptive baseline in accordance with some implementations. The adaptive baseline computation module 110 includes a dynamic forgetting factor calculator 112 that is used for calculating values of a forgetting factor that can dynamically vary based on different time gaps (or time differences) between sample metric values 108. Although the dynamic forgetting factor calculator 112 is depicted as being part of the adaptive baseline computation module 110 in FIG. 1, it is noted that in alternative examples, the dynamic forgetting factor calculator 112 can be a module that is separate from the adaptive baseline computation module 110.

In other examples, multiple detection systems 106 can be provided.

Figure 2:
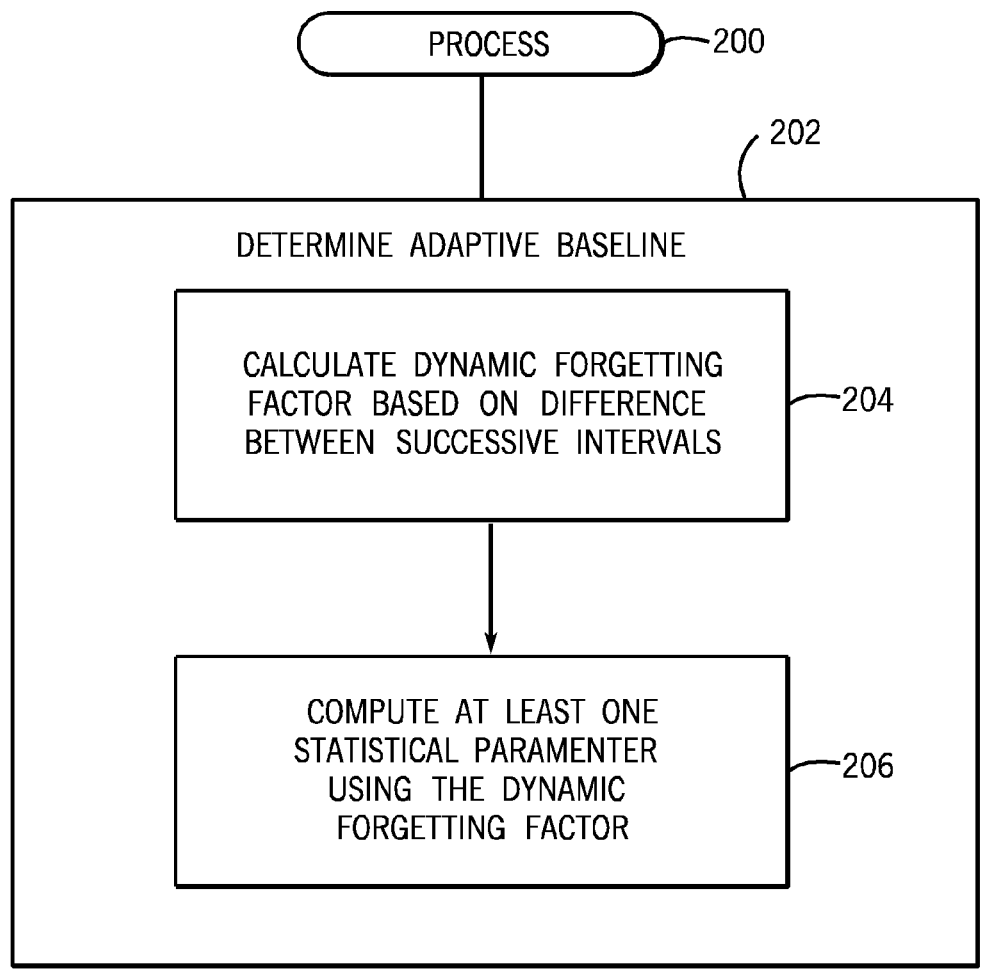
FIG. 2 is a flow diagram of an adaptive baseline determination process according to some implementations.

FIG. 2 is a flow diagram of a process 200 according to some implementations. The process 200 can be performed by the adaptive baseline computation module 110 and the dynamic forgetting factor calculator 112.

The process 200 determines (at 202) an adaptive baseline, where the adaptive baseline includes at least one statistical parameter that is based on the sample values of a metric provided at irregular intervals. The at least one statistical parameter is adaptive in the sense that the value of the statistical parameter can vary as additional metric sample values are received. As noted above, the at least one statistical parameter can include a mean and/or a standard deviation. In other examples, the adaptive baseline can include other types of statistical parameters.

The determination performed at 202 includes calculating (at 204) a dynamic forgetting factor, where the dynamic forgetting factor is based on time differences between successive intervals of the metric sample values. The determination performed at 202 further includes computing (at 206) the statistical parameter (e.g. mean and/or standard deviation, or other statistical parameter(s)) using the dynamic forgetting factor that causes different weights to be placed on corresponding sample values of the metric.

The computation of a mean and/or a standard deviation for use as part of the adaptive baseline determination is discussed in further detail below. In the ensuing discussion, i represents a sample received in a respective interval (e.g. time interval), where i=1-N, and where N represents the sample received in the most recent time interval, and a lower value of i represents a sample received in an earlier time interval.

A time difference (dt) between successive samples i and i−1 (received in successive time intervals) is represented as follows:

$$dt = T[i] - T[i-1],$$

where T[i] represents a time point of sample i, and T[i−1] represents a time point of sample i−1.

The dynamic forgetting factor ($\alpha$) that varies as a function of time difference (dt) between intervals can be computed as follows:

$$\alpha(dt) = k^{\left(\frac{dt}{half\_weight\_time\_duration}\right)},$$

where k is a specified constant value (e.g. k=0.5 or other value), and half_weight_time_duration is a specified constant time duration for which the forgetting factor is k (e.g. 0.5 or other value). The values of k and half_weight_time_duration can be predefined, or can be dynamically set (such as by a user or by an automated entity such as a computer or executable code). More generally, the specified constant, half_weight_time_duration, indicates a time duration for which the forgetting factor has a specified fractional value, as expressed by k.

In other examples, other techniques of computing the forgetting factor ($\alpha$) can be used. Generally, the forgetting factor ($\alpha$) is computed based on the time difference dt.

To handle situations where the time difference dt is relatively small (which can result in poor performance in the computation of the adaptive baseline), the dynamic forgetting factor ($\alpha$) can be set as follows for relatively small values of dt:

if ($dt$<minimum_$\alpha$_$dt$), $\alpha(dt)=\alpha$(minimum_$\alpha$_$dt$), where minimum_$\alpha$_dt is a specified (predefined or dynamically settable) minimum time difference. In other examples, other ways of setting the dynamic forgetting factor ($\alpha$) can be used for relatively small values of dt.

Using the dynamic forgetting factor ($\alpha$) as computed above, statistical parameters (e.g. mean, $\mu$, and standard deviation, $\sigma$) for a current time point T[i] of a current sample i can be computed as follows:

$$\mu(T[i])=(1-\alpha(T[i]-T[i-1]))\cdot v[i]+\alpha(T[i]-T[i-1])\cdot \mu(T[i-1]),$$

$$\sigma(T[i])=\sqrt{SumOfSquares(T[i])-\mu(T[i])^2},$$

where $$SumOfSquares(T[i])=(1-\alpha(T[i]-T[i-1]))\cdot v(i)^2+\alpha(T[i]-T[i-1])\cdot SumOfSquares(T[i-1]).$$

In the foregoing, v(i) represents a sample value of a metric in the sample i.

The foregoing equation for the mean ($\mu$) specifies that the mean is based on: (1) the metric sample value, v(i), in the current sample i, as weighted by a first weight, (1−$\alpha$(T[i]−T[i−1])), and (2) a previously calculated mean value, $\mu$(T[i−1]), as weighted by a second weight, $\alpha$(T[i]−T[i−1]). Both the first and second weights are based on the dynamic forgetting factor, $\alpha$(T[i]−T[i−1]).

The first and second weights can be computed such that greater weight is placed on the current metric sample value, v(i), and less weight is placed on prior metric sample values, as reflected in $\mu$(T [i−1]).

The standard deviation ($\sigma$) is similarly calculated.

The dynamic forgetting factor $\alpha$(dt) exhibits the following characteristics:

$$\alpha(T2-T1)\cdot \alpha(T3-T2)=\alpha(T3-T1),$$

and $$\alpha(half\_weight\_time\_duration)=k.$$

The characteristic α(T2−T1)·α(T3−T2)=α(T3−T1) specifies that the forgetting factor (α) between any two metric sample values (at time points T3 and T1) will be the same whether or not there is a third sample value (at time point T2) between the two sample values.

The characteristic α(half_weight_time_duration)=k (assuming k=0.5) indicates that older data, at time points earlier than half_weight_time_duration, will have half the weight of a current sample metric value (at a current time point T[i]).

Figure 3:
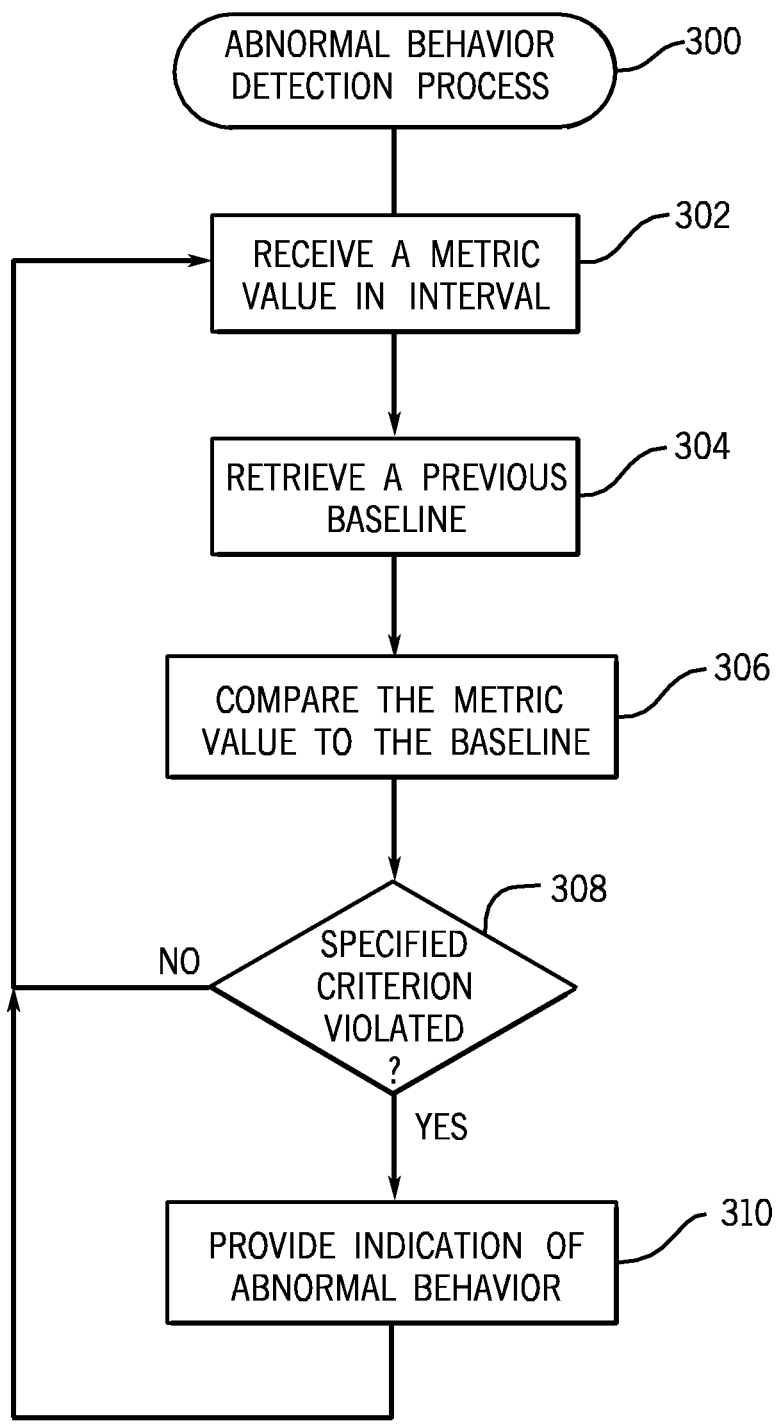
FIG. 3 is a flow diagram of a process of detecting abnormal behavior in a monitored environment, according to some implementations.

FIG. 3 is a flow diagram of an abnormal behavior detection process 300 according to some implementations. The process 300 receives (at 302) a metric value in a current sample i. The process 300 is able to determine whether this current metric value is indicative of abnormal behavior in a monitored environment. The process 300 includes retrieving (at 304) a previous baseline (computed for a previous sample i−1, for example). The retrieved baseline can include a mean (μ) and/or standard deviation (σ), for example.

The process 300 then compares (at 306) the current metric value (for sample i) to the previous baseline to determine (at 308) whether the current metric value violates a specified criterion. In some examples, the current metric value can be determined to violate the specified criterion if the current metric value is more than p (where p=3 or some other value) standard deviations (σ) from the mean (μ) of the previous baseline.

If the current sample metric value does not violate the specified criterion, then the process 300 returns (to task 302) to perform processing of the next received metric value. However, if the current metric value violates the specified criterion, then an indication of abnormal behavior can be provided (at 310) by the process 300. The indication can be in the form of an alert generated in a user interface, or a message sent in an e-mail or text message, or any other type of indication. Alternatively, the indication can be a signaling message sent by the process 300 to an application or a computer.

Figure 4:
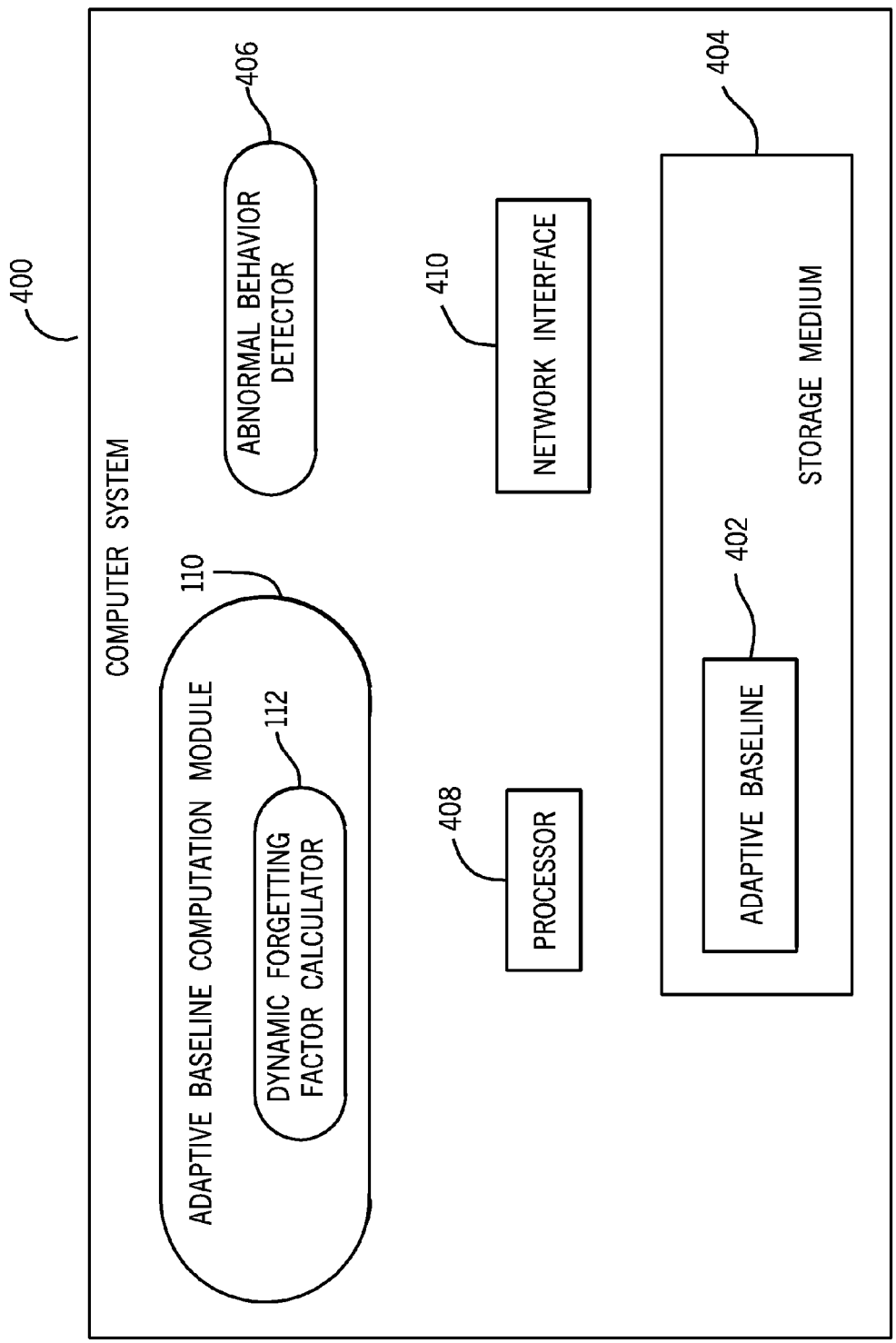
FIG. 4 is a block diagram of an example computer system according to some implementations.

FIG. 4 is a block diagram of an example computer system 400 that incorporates some implementations. The computer system 400 can include the adaptive baseline computation module 110 of FIG. 1, which, in combination with the dynamic forgetting factor calculator 112 can compute an adaptive baseline 402 that can be stored in a storage medium (or storage media) 404 of the computer system 400. The adaptive baseline computation module 110 and dynamic forgetting factor calculator 112 can perform tasks according to FIG. 2.

In some implementations, the computer system 400 can also include an abnormal behavior detector 406 that is able to use the adaptive baseline 402 for detecting abnormal behavior of a monitored environment. The abnormal behavior detector 406 can perform tasks according to FIG. 3.

In other examples, instead of providing the abnormal behavior detector 406 in the same computer system 400 as the adaptive baseline computation module 110, the abnormal behavior detector 406 can be provided on a different computer system. In such an example, the adaptive baseline 402 can be communicated by the computer system 400 to the other computer system on which the abnormal behavior detector 406 is executed.

The adaptive baseline computation module 110, dynamic forgetting factor calculator 112, and abnormal behavior detector 406 can be implemented as machine-readable instructions executed on one or multiple processors 408. A processor can include a microprocessor, microcontroller, processor module or subsystem, programmable integrated circuit, programmable gate array, or another control or computing device.

The computer system also includes a network interface 410 that allows the computer system 400 to communicate over a network, such as the network 104 of FIG. 1.

The storage medium (or storage media) 404 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   determining, by a system having a processor, an adaptive baseline that includes at least one statistical parameter based on values of a metric that are provided at irregular intervals;
   wherein the determining includes:
      computing the statistical parameter using a forgetting factor that causes different weights to be placed on the corresponding values of the metric; and
      calculating the forgetting factor based on a difference between the irregular intervals, wherein the irregular intervals comprise first successive intervals that are separated by a first gap, and second successive time intervals that are separated by a second gap different from the first gap, and wherein a value of the calculated forgetting factor for the first successive intervals is different from a value of the calculated forgetting factor for the second successive intervals; and
   detecting, by the system using the adaptive baseline, an abnormal behavior of a monitored environment indicated by a given value of the metric.

2. The method of claim 1, wherein detecting the abnormal behavior is based on comparing the given value of the metric to the adaptive baseline.

3. The method of claim 2, wherein the adaptive baseline includes a mean and a standard deviation computed based on historical values of the metric, and wherein detecting the abnormal behavior is based on the mean and standard deviation.

4. The method of claim 1, wherein calculating the forgetting factor comprises calculating the forgetting factor that is based on a value equal to the difference divided by a constant indicating a time duration for which the forgetting factor has a specified fractional value.

5. The method of claim 1, wherein the irregular intervals are irregular time intervals, and wherein the difference is a time difference between a pair of time intervals.

6. The method of claim 1, wherein computing the statistical parameter comprises:
deriving a first weight using the forgetting factor, the first weight to be applied on a value of the metric in a first interval; and
deriving a second weight using the forgetting factor, the second weight to be applied on a value based on values of the metric in other intervals.

7. The method of claim 6, wherein the value based on values of the metric in other intervals includes a previously calculated version of the statistical parameter.

8. An article comprising at least one non-transitory machine-readable storage medium storing instructions that upon execution cause a system to:
receive sample values of a metric at irregular time intervals;
compute a forgetting factor that varies in value according to a time difference between the irregular time intervals, wherein the irregular time intervals comprise first successive time intervals that are separated by a first time gap, and second successive time intervals that are separated by a second time gap different from the first time gap, and wherein the value of the computed forgetting factor for the first successive time intervals is different from the value of the computed forgetting factor for the second successive time intervals;
compute a statistical parameter based on the forgetting factor, the forgetting factor causing different weights to be placed on corresponding sample values of the metric, and the statistical parameter being part of an adaptive baseline; and
detect, using the adaptive baseline, an abnormal behavior of a monitored environment based on values of the metric.

9. The article of claim 8, wherein computing the statistical parameter comprises computing at least one of a mean and a standard deviation.

10. The article of claim 8, wherein computing the statistical parameter comprises:
deriving a first weight based on the forgetting factor;
applying the first weight to a value of the metric in a first time interval;
deriving a second, different weight based on the forgetting factor; and
applying the second weight on a previously computed version of the statistical parameter, the previously computed version of the statistical parameter being based on values of the metric in other time intervals.

11. The article of claim 8, wherein computing the forgetting factor comprises computing the forgetting factor based on a value equal to the difference divided by a specified constant, the specified constant indicating a time duration for which the forgetting factor has a specified fractional value.

12. A computer system comprising:
at least one processor to:
receive values of a metric that are provided at irregular intervals;
calculate a forgetting factor based on a difference between the irregular intervals, wherein the irregular intervals comprise first successive intervals that are separated by a first gap, and second successive time intervals that are separated by a second gap different from the first gap, and wherein a value of the calculated forgetting factor for the first successive intervals is different from a value of the calculated forgetting factor for the second successive intervals;
compute a statistical parameter using the forgetting factor that causes different weights to be placed on the corresponding values of the metric; and
using the statistical parameter as an adaptive baseline for detecting abnormal behavior of a monitored environment in which the metric is monitored.

13. The computer system of claim 12, further comprising a network interface in communication with at least one monitoring agent, the values of the metric received from the at least one monitoring agent.

14. The computer system of claim 12, wherein the difference between the intervals comprises a time difference between the intervals.

15. The computer system of claim 12, wherein the statistical parameter includes at least one of a mean and a standard deviation.

16. The computer system of claim 15, wherein the abnormal behavior is indicated by a current value of the metric being more than a predefined number of standard deviations different from the mean.

* * * * *